L. HAMMOND.
STEREOSCOPIC MOTION PICTURE.
APPLICATION FILED MAR. 2, 1921.
1,435,520.
Patented Nov. 14, 1922.
2 SHEETS—SHEET 2.
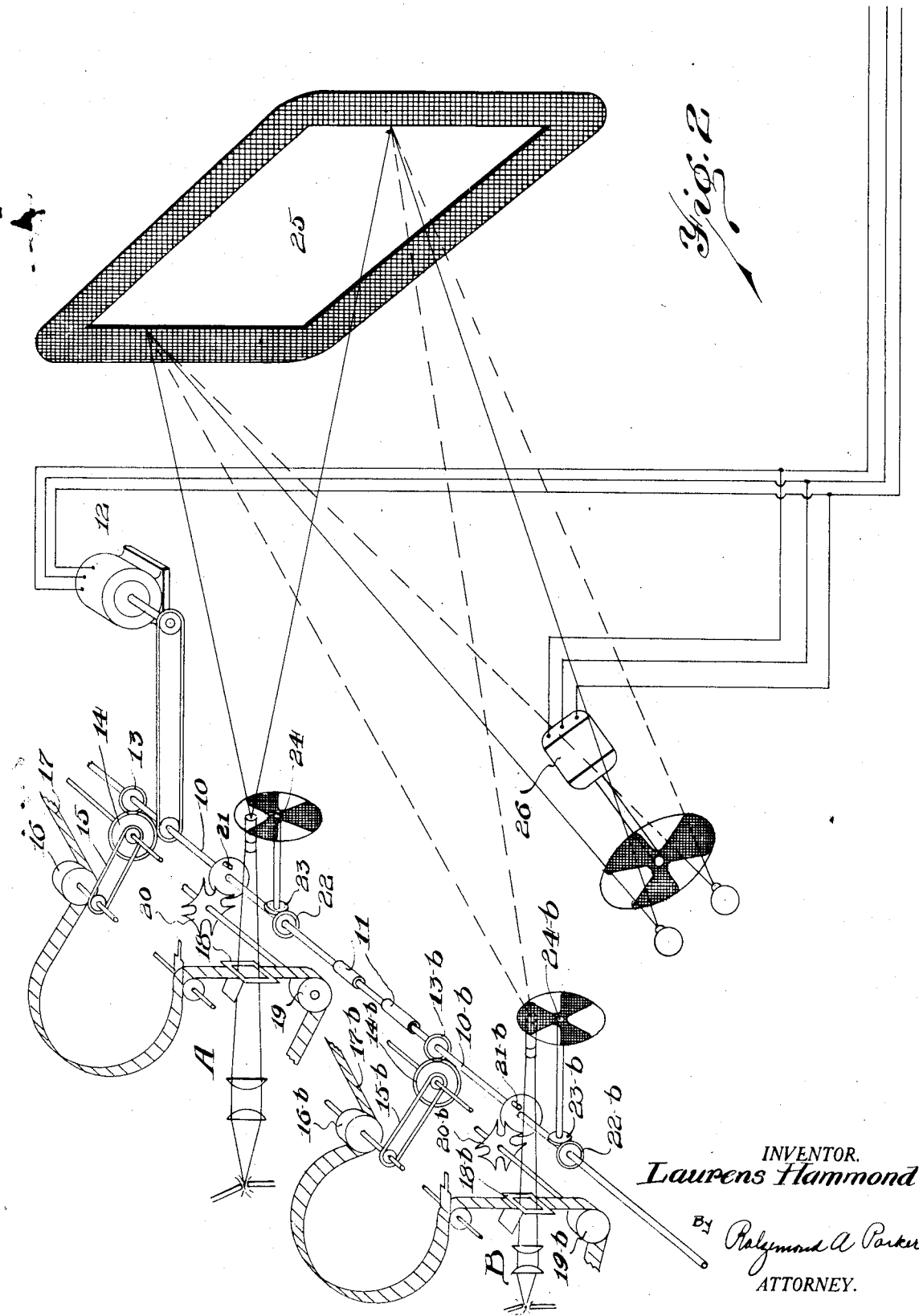
INVENTOR.
Laurens Hammond
By Raymond A. Parker
ATTORNEY.

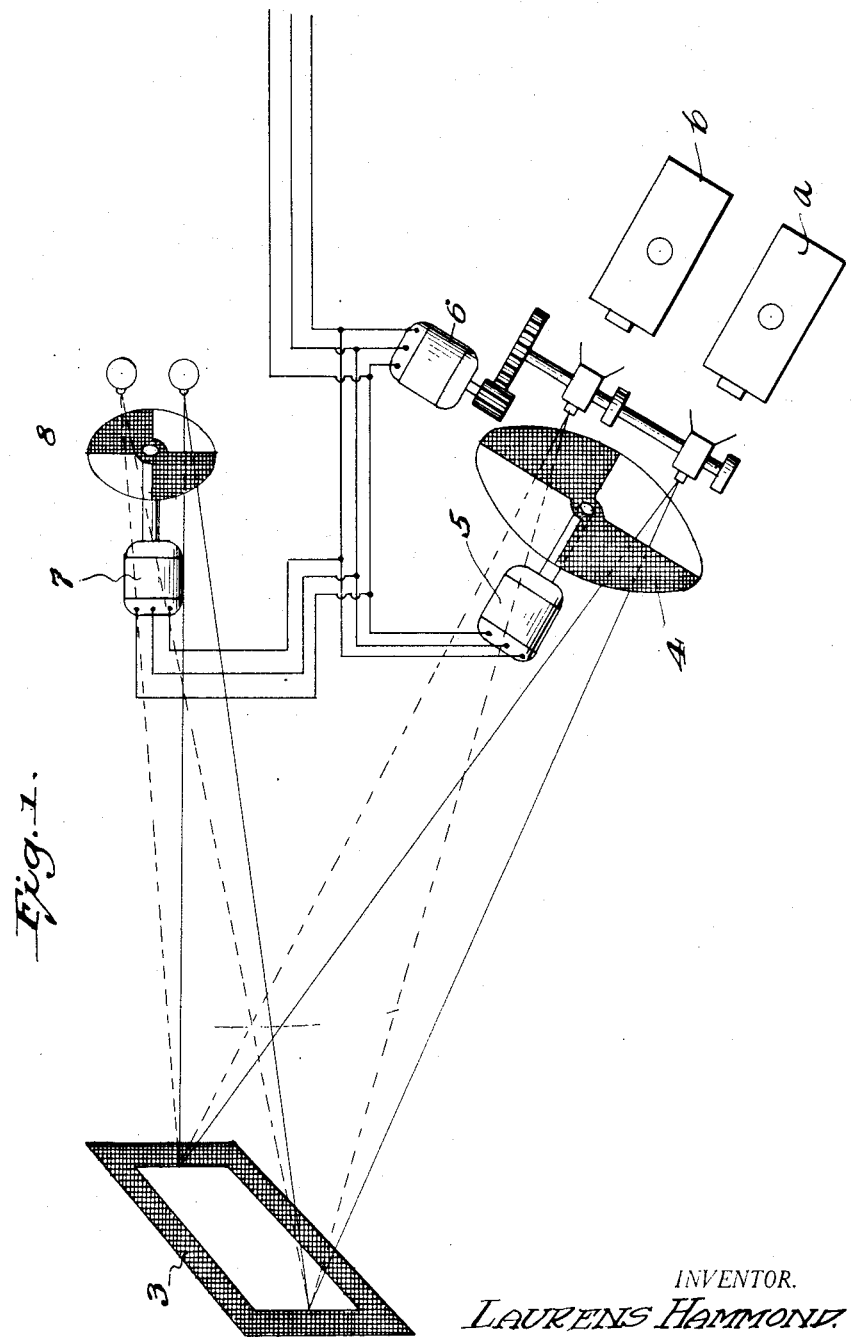

Patented Nov. 14, 1922.

1,435,520

UNITED STATES PATENT OFFICE.

LAURENS HAMMOND, OF DETROIT, MICHIGAN, ASSIGNOR TO THE TELEVIEW CORPORATION, OF CHICAGO, ILLINOIS, A CORPORATION OF ILLINOIS.

STEREOSCOPIC MOTION PICTURE.

Application filed March 2, 1921. Serial No. 448,963.

*To all whom it may concern:*

Be it known that I, LAURENS HAMMOND, citizen of the United States, residing at Detroit, county of Wayne, State of Michigan, have invented a certain new and useful Improvement in Stereoscopic Motion Pictures, and declare the following to be a full, clear, and exact description of the same, such as will enable others skilled in the art to which it pertains to make and use the same, reference being had to the accompanying drawings, which form a part of this specification.

My invention relates to the projection and viewing of motion pictures stereoscopically. A common stereoscope makes use of a pair of pictures showing the object as seen from two positions whose separation is approximately equal to that of the right and left eye, and pictures analogous to the pictures of such a pair are herein designated as "right" pictures and "left" pictures or as the "right eye view" and "left eye view." Through the use of the stereoscope the effect of bifocal vision as it occurs in real life is reproduced and the objects shown in the photograph appear in relief.

It has previously been proposed to accomplish this effect in motion pictures by the projection on a viewing screen alternately of right and left eye views of the same scene, the separate photographs which make up the motion picture following each other in rapid succession on the screen and being viewed once only by each eye. This might be accomplished either through the use of two lanterns or projecting machines each provided with a separate film, one adapted to project the right eye views the other to project the left eye views, right and left eye views being projected alternately, separate photographs succeeding each other in rapid succession; or only one projecting machine might be used and one film separate right and left eye views of the same scene succeeding one another on the film.

Viewing apparatus was provided through the use of which the screen might be viewed by an observer. By means of this viewing apparatus the right eye of the observer was to see the right eye view only and the left eye of the observer the left eye view only. The viewing apparatus comprised a moving member or shutter adapted to obscure the view of the observer's right and left eye alternately. The motion of this shutter was so timed as to coincide with the projection of the photographs on the screen in such a manner that the time of obscuring the view of the observer's right eye or left eye coincided with the projection of the right and left photograph on the screen in such a manner that the right eye saw only the projection of the right eye views and the left eye saw only the projection of the left eye views. The two eyes never saw at the same time and each eye viewed its picture after the other, but the impressions came so fast as to be fused in consciousness, with the result that the image was intended to stand out in relief.

This apparatus never proved satisfactory. Due to the speed at which the motion picture film is shifted to bring the separate photographs comprising the animated picture in position for projection—for example, sixteen photographs per second—a shuttering of the right and left eye alternately to obscure the vision so that the right eye would see the right eye view only and the left eye the left eye view only during its period of projection on the screen, would produce a flicker so objectionable as to render the use of this process undesirable. A construction similar to the above is described in Patent No. 606,993 to Jenkins.

In standard motion picture projection, to do away with the flicker, it is necessary that the screen be darkened approximately forty-two times or more per second, therefore, to project and view motion pictures stereoscopically as just described with a time period of screen darkening such as to avoid flicker it would be necessary to so speed up the film that a film of excessive length would be required and each eye would see its view but an exceedingly small fraction of a second.

The object of my invention is to provide a satisfactory process making use of practical means for projecting and viewing motion pictures stereoscopically by the use of alternate right and left eye projections, the apparatus for which makes use of a minimum length of film and operates with the production of a minimum of flicker.

My process consists in projecting on a screen right and left eye views alternately and projecting each view more than once, for example, if each photograph is projected three times my projecting and viewing apparatus would be so constructed and synchronized that the right eye view of picture A would be projected and viewed by the right eye then the left eye view of A would be projected and viewed by the left eye, then right eye view A would be viewed a second time with the right eye and left eye view A viewed a second time with the left eye and right eye view A viewed a third time by the right eye and left eye view A viewed a third time by the left eye, then the film would be moved to project view B in the sequence in a similar manner, each succeeding view on the film being similarly projected and viewed. With this method of projecting and viewing there would be no objectionable flicker and each view would be seen by the proper eye in such a time period as to approximate the best practice of the present time.

Applicant has described and claimed in co-pending application No. 451,276 a particular form of shutter apparatus designed to effectively obscure the vision of first one eye, then the other.

Fig. 1 of the drawing is an illustrative diagram of an embodiment of apparatus designed to function as described in my process.

For the sake of convenience as to description and simplicity of form I prefer to show two projecting machines $a$ and $b$ adapted to project right and left eye views alternately on substantially the same space on a screen 3 by means of a movable shutter 4, which shutter is adapted to first obscure the light from one machine, then the other in a determined time period of alternate succession. I show a synchronous motor 5 for driving such interrupting projection shutter, a similar motor 6 for regulating the movement of the film and a substantially similar motor 7 for driving a viewing shutter 8 adapted to obscure the vision of first one eye of the observer, then the other, which motors are so connected together as to be driven from a common source of alternating current supply as shown in Fig. 1.

The viewing shutter 8 is so synchronized with the projection of the photographs on the screen that the view of the right eye is obscured during the time the left eye picture is projected on the screen, and the view of the left eye is obscured during the time the right eye picture is on the screen. The motor 6 is so synchronized with the picture projection and the movement of the viewing shutter that each right and left eye view is permitted to be projected on the screen alternately a successive number of times so as to be viewed by the right or left eye more than once, for example, the right eye view might be projected so as to be viewed by the right eye three times and the left eye view alternately projected so as to be viewed by the left eye three times, then the film so moved as to project picture No. 2 in the series.

It is apparent that it would not be necessary to provide three synchronous motors as illustrated and the form of construction described is a small one adapted to perform the work and which lends itself easily to an explanation of my process and device. I have also shown the shutter device in diagrammatic form. It is quite apparent that the viewing shutter would be provided with means for being supported and would be enclosed and that more than two transparent sections and blades could be provided. As a matter of convenient description, however, I have shown a shutter provided with two transparent portions or openings and alternating opaque portions.

In Fig. 2 I have shown projectors indicated as A and B of standard type and identical in construction, in which similar parts are indicated with the same reference character except that in machine B the reference characters carry the subletter "b." As the machines are of identical construction, but one will be described. The main shaft 10 of projector A is mechanically coupled with main shaft $10^b$ of projector B by means of collars 11 which so couple the separate shaft sections together that shaft 10 runs 60 degrees in advance of shaft $10^b$. Shaft 10 is driven positively from a synchronous alternating current motor 12 as shown at a predetermined rate of speed.

By means of reducing gears 13 and 14 and a drive chain 15 an upper steady feed sprocket 16 is driven at one-quarter the rate of speed of the main shaft 10. A strip of film 17 comes from the upper magazine, now shown in the drawing, and feeds over the sprocket 16 down through the gate 18 of the machine, over the intermittent feed sprocket 19 into the lower magazine, likewise omitted from the drawing.

The intermittent movement, adapted to drive the sprocket 19, is standard and comprises a notched disk 20 adapted to be engaged by a pin 21 carried by a disk mounted on the shaft 10 so that disk 20 will be rotated one-quarter of a revolution for each complete revolution of the main shaft 10. As the disk 20 and the sprocket 19 are carried by the same shaft intermittent sprocket 19 will rotate one-quarter of a revolution for each revolution of the main shaft.

Driven directly from the main shaft, at the same rate of speed and by means of gears 22 and 23, is a three blade flicker shutter 24 positioned in front of the objective lenses of the camera and adapted to interrupt the light rays therefrom. All this is standard construction.

For each one-quarter turn of the intermittent sprocket the film is moved one picture. As the flicker shutter makes a complete revolution for each quarter revolution of the intermittent sprocket, the light rays are interrupted three times during the shooting of a single picture, or the picture may be said to be projected three times.

Both the projectors are set so as to project on substantially the same place on a screen 25, and are driven by alternating current from the same source of alternating current supply as a synchronous motor 26 which drives an eye piece shutter 27. This eye piece shutter is adapted for individual use and is comprised in an individual eye piece as shown in my copending application above referred to. Looking through the eye piece a spectator may view the pictures projected on the screen bifocally but not with both eyes at the same time, but first with one eye then with the other. This eye piece shutter is constructed as shown so that during the time there is a clear vision for the right eye of the observer through a transparent portion of the shutter, the view of the left eye is obstructed by one of the shutter blades and vice versa.

The shutter is so synchronized in rotation with the rotation of the flicker shutters that the left eye view of the observer through the eye piece is unobstructed only during the projection of left eye pictures on the screen at which time the right eye view of the observer is obstructed; and the right eye view of the observer through the eye piece is unobstructed only during the time right eye pictures are projected on the screen during which time the left eye view is obstructed.

Having thus described my invention, what I claim is:

1. The process of producing stereoscopic effect in motion picture projection which consists in projecting right and left eye views of each successive picture in the movement series alternately and more than once and obstructing the view of an observer so that the right eye projected pictures are seen with the right eye only and the left eye projected pictures are seen with the left eye only.

2. The process of producing stereoscopic effect in motion picture projection which consists in projecting on a viewing screen in thrice alternate succession right and left eye views of each successive picture in the movement series and obstructing the view of an observer so that the right eye projected pictures are seen with the right eye only and the left eye projected pictures are seen with the left eye only.

3. The process of producing stereoscopic effect in motion picture projection which consists in projecting on a screen alternately and more than once right and left eye views of the successive pictures in the movement series, providing means through which an observer may bifocally view the projected pictures, such means adapted to alternately obstruct the sight first from one eye of the observer then the other in such a time relationship with the projection of the right and left eye view pictures on the screen that the right eye may see right eye pictures and the left eye left eye pictures only and shifting the pictures to bring the successive pictures in the movement series into position for projecting in a determined synchronous time relationship with the picture projection.

4. The process of producing stereoscopic effect in motion picture projection which consists in projecting alternately a plural number of times right and left eye views of the successive pictures in the movement series and observing said projected pictures through means comprising a rotatable shutter mechanism adapted to alternately obstruct the sight first from one eye then the other in such a manner that the right eye may see right eye pictures and the left eye may see left eye pictures only.

5. In apparatus for producing stereoscopic effect in motion picture projection, the combination of means for projecting on a screen alternately a plural number of times right and left eye views of each successive picture in the movement series, and means through which an observer may view the projected pictures comprising a rotary shutter adapted to obstruct the sight first from one eye then the other in such a synchronous time relationship with picture projection that the right eye may see right eye views only and the left eye left eye views only.

6. In apparatus for producing stereoscopic effect in picture projection, the combination of means for projecting on a screen in alternate succession and more than once right and left eye views of a picture, an individual bifocal eye piece comprising a rotary shutter adapted when rotated to obstruct the view of first one eye then the other through the eye piece, means for driving the shutter in such a synchronous relationship with the picture projection that the right eye view only through the eye piece is unobstructed during the projection of right eye view pictures and the left eye view only is unobstructed during the projection of left eye view pictures.

7. In the production of stereoscopic effect in picture projection, in combination with a single source of alternating current supply, electrically controlled projecting apparatus driven by current from said source of supply adapted to project on a screen in alternate succession right and left eye views of a picture, an electrically controlled individual optical device through which a spectator may view the projected pictures adapted to obstruct the sight therethrough first from one eye then the other, said optical device driven by current from said source of supply in such a time relationship with the picture projection that the right eye view through the eye piece is obstructed during the projection of left eye view pictures and the left eye view through the eye piece is obstructed during the projection of right eye view pictures.

8. In the stereoscopic projection of motion pictures, in combination, apparatus for projecting alternately and more than once right and left eye views of the same picture on substantially the same place on a screen, an individual eye piece comprising a rotary shutter through which a spectator may view the pictures projected on the screen which shutter is adapted to obstruct the sight first of one eye then the other through the eye piece, means for electrically driving said eye piece shutter and projection apparatus by alternating current furnished from a single source of current supply and in such a synchronous time relationship that the right eye view only through the eye piece is unobstructed during the projection of right eye view pictures and the left eye view only through the eye piece is unobstructed during the projection of left eye view pictures.

In testimony whereof, I sign this specification.

LAURENS HAMMOND.